United States Patent
Akiike et al.

(10) Patent No.: US 6,528,605 B1
(45) Date of Patent: Mar. 4, 2003

(54) DIYNE-CONTAINING (CO)POLYMER, PROCESSES FOR PRODUCING THE SAME, AND CURED FILM

(75) Inventors: Toshiyuki Akiike, Mie (JP); Matthias Patz, Ibaraki (JP); Masayuki Takahashi, Ibaraki (JP); Kohei Goto, Ibaraki (JP); Michinori Nishikawa, Ibaraki (JP); Takashi Okada, Ibaraki (JP); Kinji Yamada, Ibaraki (JP)

(73) Assignee: JSR Corporation, Tokyo (JP)

( * ) Notice: Subject to any disclaimer, the term of this patent is extended or adjusted under 35 U.S.C. 154(b) by 105 days.

(21) Appl. No.: 09/708,016

(22) Filed: Nov. 8, 2000

(30) Foreign Application Priority Data

Nov. 9, 1999 (JP) .......................................... 11-318940

(51) Int. Cl.$^7$ .......................... C08F 38/00; C08F 38/02
(52) U.S. Cl. ........................ 526/285; 526/135; 526/147; 526/293; 526/294; 526/295; 526/313; 585/19; 585/25; 585/428; 585/505
(58) Field of Search ................................. 526/135, 147, 526/285, 293, 294, 295, 313; 585/19, 25, 428, 505

(56) References Cited

U.S. PATENT DOCUMENTS

| | | |
|---|---|---|
| 3,300,456 A | 1/1967 | Hay |
| 4,417,039 A | 11/1983 | Reinhardt et al. |
| 4,767,797 A | 8/1988 | Al et al. |
| 5,589,424 A | * 12/1996 | Kwock et al. ............... 427/504 |

OTHER PUBLICATIONS

D. L. Trumbo, et al., Journal of Polymer Science: Part A: Polymer Chemistry, vol. 24, pp. 2311–2326, "Polymerization Using Palladium (II) Salts: Homopolymers and Copolymers from Phenylethynyl Compounds and Aromatic Bromides", 1986.

H. Haeger, et al., Macromol. Chem. Phys. vol. 199, No. 9, pp. 1821–1826, "Syntesis of Poly(Phenyleneethynylene) Without Dione Defects ", 1998.

* cited by examiner

*Primary Examiner*—Tatyana Zalukaeva
(74) *Attorney, Agent, or Firm*—Oblon, Spivak, McClelland, Maier & Neustadt, P.C.

(57) ABSTRACT

A diyne-containing (co)polymer which is soluble in organic solvents, has excellent processability, and gives a cured coating film excellent in heat resistance, solvent resistance, and low-dielectric characteristics, and mechanical strength; processes for producing the same; and a cured film. The diyne-containing (co)polymer contains at least 10 mol % repeating units represented by the following formula (1) and has a weight-average molecular weight of from 500 to 1,000,000:

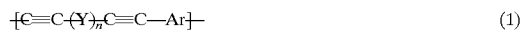

$$\{C\equiv C\text{-}(Y)_n\text{-}C\equiv C\text{-}Ar\}\qquad(1)$$

wherein Y represents a specific bivalent organic group; Ar represents a bivalent organic group; and n represents 1.

8 Claims, 6 Drawing Sheets

DIYNE-CONTAINING (CO)POLYMER, PROCESSES FOR PRODUCING THE SAME, AND CURED FILM

FIELD OF THE INVENTION

The present invention relates to a diyne-containing (co)polymer, processes for producing the same, and an insulating film. More particularly, the invention relates to a diyne-containing (co)polymer which is soluble in organic solvents, has excellent processability, and gives a cured coating film excellent in heat resistance, solvent resistance, mechanical strength, and low-dielectric characteristics and which is suitable for use as a material for, e.g., a low-dielectric interlayer insulating film for semiconductor elements such as LSIs, system LSIs, DRAMs, SDRAMs, RDRAMs, and D-RDRAMs, a surface coat film or another protective film for semiconductor elements, a low-dielectric interlayer insulating film for multilayered circuit boards, a protective film or insulating film for liquid-crystal display elements, and a gas separation membrane. The invention further relates to processes for efficiently producing the diyne-containing (co)polymer and to a cured film obtained by curing the (co)polymer.

DESCRIPTION OF THE RELATED ART

In the field of electronic materials, the recent progress toward a higher degree of integration, a larger number of functions, and higher performances has resulted in increased circuit resistance and increased capacitance between circuits and this in turn has resulted in increases in power consumption and delay time. In particular, an increase in delay time is an important factor contributing to a decrease in signal transfer speed in devices and to the occurrence of cross talk. Because of this, it is desired to reduce parasitic resistance or parasitic capacitance in order to reduce the delay time and thereby attain higher-speed device operation. One measure which is being taken in reducing the parasitic capacitance is to coat the periphery of a circuit with a low-dielectric interlayer insulating film.

Interlayer insulating films are required not only to have excellent heat resistance so as to withstand high-temperature steps in the production of printed circuit boards, such as the step of thin-film deposition and steps conducted after chip connection, pin insertion, etc., but to have chemical resistance so that they withstand wet processing. Furthermore, copper wirings, having lower resistance, are recently coming to be employed as a substitute for aluminum wirings and, with this trend, planarization by CMP (chemical mechanical polishing) has become common. Interlayer insulating films are hence required to have mechanical strength so as to withstand this processing.

SUMMARY OF THE INVENTION

The invention has been achieved in view of the desires described above.

One object of the invention is to provide a diyne-containing (co)polymer which is soluble in organic solvents, has excellent processability, and gives a cured coating film excellent in heat resistance, solvent resistance, low-dielectric characteristics, and mechanical strength and which is suitable for use as a material for, e.g., a low-dielectric interlayer insulating film for semiconductor elements such as LSIs, system LSIs, DRAMs, SDRAMs, RDRAMs, and D-RDRAMs, a surface coat film or another protective film for semiconductor elements, a low-dielectric interlayer insulating film for multilayered circuit boards, a protective film or insulating film for liquid-crystal display elements, and a gas separation membrane.

Another object of the invention is to provide processes for producing the (co)polymer.

Still another object of the invention is to provide a cured film.

The present inventors made intensive investigations in order to develop a polymer suitable for use as a material for insulating films or protective films and to thereby satisfy the desires described above. As a result, they have found that a novel polymer having specific repeating units in an amount not smaller than a specific value in mol % is suitable for those applications.

This novel polymer was found to undergo the Bergman cyclization at the specific repeating units upon heating to generate aryl radicals. Namely, this polymer was found to be crosslinked at a low temperature to accomplish those objects.

The invention has been completed based on this finding.

The invention provides the diyne-containing (co)polymer, processes for producing the same, and cured film described below.

[1] A diyne-containing (co)polymer which contains at least 10 mol % repeating units represented by the following formula (1) and has a weight-average molecular weight of from 500 to 1,000,000:

(1)

wherein Y represents a bivalent organic group represented by the following formula (2) or (3); Ar represents a bivalent organic group; and n represents 0 or 1;

(2)

wherein $R^1$ and $R^2$ may be the same or different, are located in the cis positions, and each represents a hydrogen atom, an alkyl group, or an aryl group;

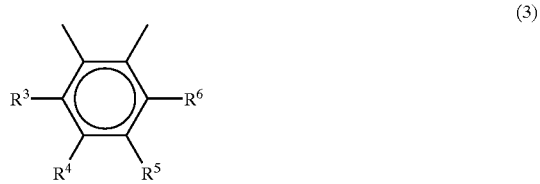
(3)

wherein $R^3$ to $R^6$ may be the same or different and each represents a hydrogen atom, a fluorine atom, an alkyl group, a halogenated alkyl group, or an aryl group.

[2] A process for producing a diyne-containing (co)polymer which comprises polymerizing (A1) at least one member selected from the group consisting of compounds represented by the following formula (4) and compounds represented by the following formula (5) with (B1) at least one compound represented by the following formula (6):

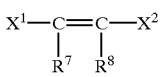
(4)

wherein $X^1$ and $X^2$ may be the same or different, are located in the cis positions, and each represents a halogen atom; and $R^7$ and $R^8$ may be the same or different and each represents a hydrogen atom, an alkyl group, or an aryl group;

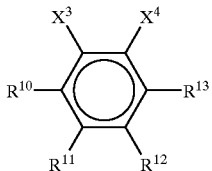
(5)

wherein $X^3$ and $X^4$ may be the same or different and each represents a halogen atom or —$SO_3R^9$, wherein $R^9$ represents an alkyl group, a fluoroalkyl group, or an aryl group; and $R^{10}$ to $R^{13}$ may be the same or different and each represents a hydrogen atom, a fluorine atom, an alkyl group, a halogenated alkyl group, or an aryl group;

$$HC\equiv C-Ar'-C\equiv CH \quad (6)$$

wherein Ar' represents a bivalent organic group.

[3] A process for producing a diyne-containing (co)polymer which comprises polymerizing (A2) at least one member selected from the group consisting of compounds represented by the following formula (7) and compounds represented by the following formula (8) with (B2) at least one compound represented by the following formula (9):

(7)

wherein $R^{14}$ and $R^{15}$ may be the same or different, are located in the cis positions, and each represents a hydrogen atom, an alkyl group, or an aryl group;

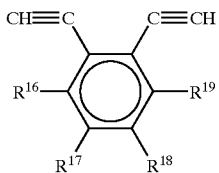
(8)

wherein $R^{16}$ to $R^{19}$ may be the same or different and each represents a hydrogen atom, a fluorine atom, an alkyl group, a halogenated alkyl group, or an aryl group;

$$X^5-Ar''-X^6 \quad (9)$$

wherein $X^5$ and $X^6$ may be the same or different and each represents a halogen atom or —$SO_3R^{20}$, wherein $R^2$ represents an alkyl group, a fluoroalkyl group, or an aryl group; and Ar'' represents a bivalent organic group.

[4] The process for producing a diyne-containing (co)polymer described in [2] or [3] above wherein the polymerization is conducted in the presence of a palladium catalyst and a basic compound.

[5] A process for producing a diyne-containing (co)polymer which comprises oxidatively polymerizing at least one compound represented by the formula (6) described above.

[6] A cured film obtained by curing the diyne-containing (co)polymer described in [1] above.

The diyne-containing (co)polymer of the invention is soluble in organic solvents and can have improved processability, because it has specific repeating units in an amount not smaller than a specific value in mol % and has a specific weight-average molecular weight. Furthermore, when the (co)polymer is applied and cured, the cured coating film can be improved in heat resistance, solvent resistance, and low-dielectric characteristics. The diyne-containing (co)polymer of the invention can be cured by a method in which the Bergman cyclization is utilized to generate aryl radicals on the polymer backbone. Thus, the diyne-containing (co)polymer can be efficiently crosslinked and cured at a low temperature. Moreover, the cured film of the invention is excellent in heat resistance, solvent resistance, mechanical strength, and low-dielectric characteristics.

DETAILED DESCRIPTION OF THE INVENTION

Figure 1:
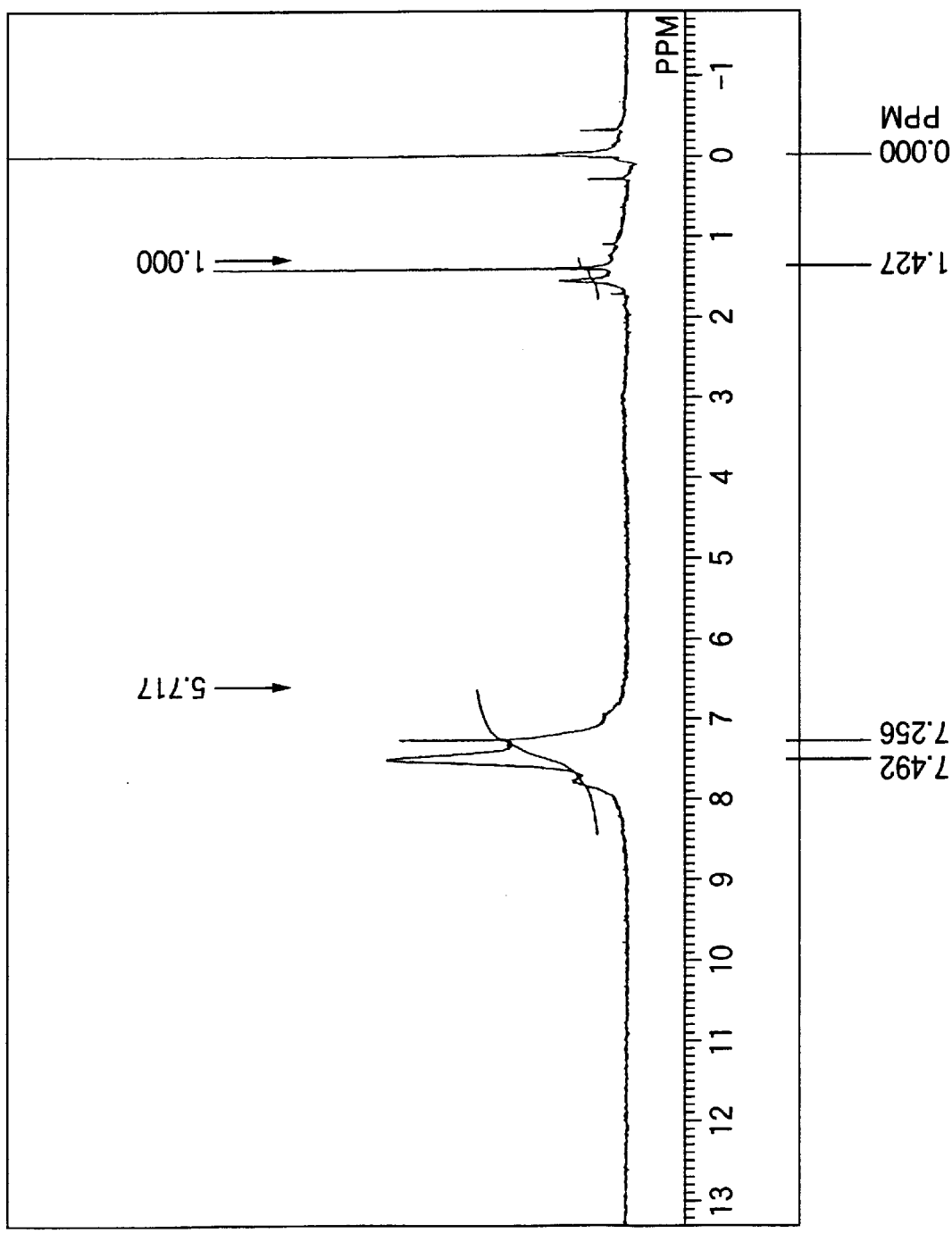
FIG. 1 is a chart showing a $^1$H-NMR spectrum of the polymer obtained in Example 1 according to the invention.

Modes for carrying out the invention will be explained below in detail.

I. Diyne-Containing (Co)polymer

The diyne-containing (co)polymer of the invention is characterized by containing repeating units represented by formula (1) in an amount of 10 mol % or larger and having a weight-average molecular weight of from 500 to 1,000,000.

The diyne-containing (co)polymer of the invention will be described below in greater detail with respect to each constituent.

1. Repeating Units Represented by Formula (1)

The diyne-containing (co)polymer of the invention has repeating units represented by formula (1) in an amount of 10 mol % or larger. For convenience of explanation, formula (1) is shown below again.

(1)

[In formula (1), Y represents a bivalent organic group represented by the following formula (2) or (3); Ar represents a bivalent organic group; and n represents 0 or 1.]

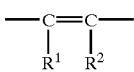
(2)

[In formula (2), $R^1$ and $R^2$ may be the same or different, are located in the cis positions, and each represents a hydrogen atom, an alkyl group, or an aryl group.]

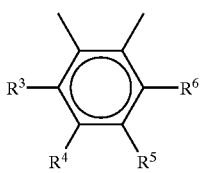
(3)

[In formula (3), $R^3$ to $R^6$ may be the same or different and each represents a hydrogen atom, a fluorine atom, an alkyl group, a halogenated alkyl group, or an aryl group.]

In formula (2), examples of the alkyl group represented by $R^1$ or $R^2$ include methyl, ethyl, isopropyl, and n-propyl; and examples of the aryl group include phenyl.

In formula (3), examples of the alkyl group represented by each of $R^3$ to $R^6$ include methyl, ethyl, isopropyl, and n-propyl; examples of the halogenated alkyl group include trifluoromethyl and pentafluoroethyl; and examples of the aryl group include phenyl and pentafluorophenyl.

Examples of the bivalent organic group represented by Y in formula (1) include cis-vinylene and 1,2-phenylene.

Examples of the bivalent organic group represented by Ar in formula (1) include 1,2-phenylene, 1,3-phenylene, 1,4-phenylene, and the following groups (a) to (j).

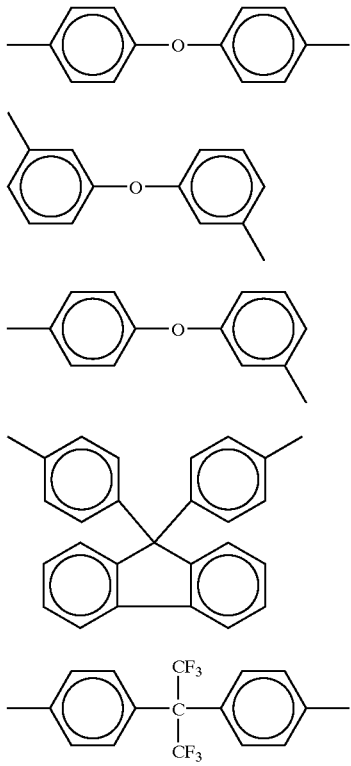

(a)
(b)
(c)
(d)
(e)

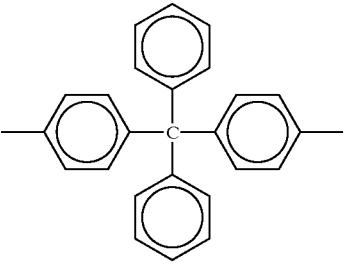

(f)

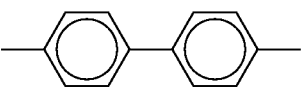

(g)

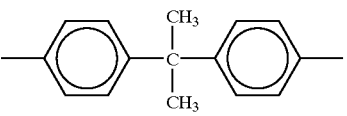

(h)

(i)

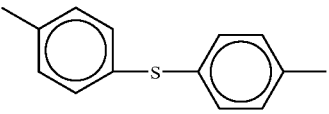

(j)

Preferred of these are aromatic groups such as 1,3-phenylene, 1,4-phenylene, and the groups (a) and (d).

The diyne-containing (co)polymer of the invention has repeating units represented by formula (1) in an amount of 10 mol % or larger, preferably 20 mol % or larger, more preferably 30 mol % or larger, most preferably 50 mol % or larger. If the content of the repeating units is lower than 10 mol %, the (co)polymer gives a cured film having insufficient solvent resistance.

2. Weight-Average Molecular Weight

The weight-average molecular weight of the diyne-containing (co)polymer of the invention is from 500 to 1,000,000, preferably from 1,000 to 200,000. If the weight-average molecular weight thereof is lower than 500, the (co)polymer gives a coating film having insufficient properties. If the weight-average molecular weight thereof exceeds 1,000,000, the (co)polymer has insufficient solubility in organic solvents, resulting in an increased viscosity and a coating film (cured film) having poor smoothness.

II. Processes for Producing Diyne-Containing (Co)polymer

One process of the invention for producing a diyne-containing (co)polymer comprises polymerizing (A1) at least one member selected from the group consisting of compounds represented by formula (4) given above and compounds represented by formula (5) given above with (B1) at least one compound represented by formula (6) given above (hereinafter, this process is often referred to as "first process").

Another process of the invention for producing a diyne-containing (co)polymer comprises polymerizing (A2) at least one member selected from the group consisting of compounds represented by formula (7) given above and compounds represented by formula (8) given above with (B2) at least one compound represented by formula (9) given above (hereinafter, this process is often referred to as "second process").

1. First Process

In the first process, polymerizable ingredient (A1) is polymerized with polymerizable ingredient (B1).

(1) Polymerizable Ingredient (A1)

Polymerizable ingredient (A1) is at least one member selected from the group consisting of compounds represented by formula (4) and compounds represented by formula (5).

(i) Compounds Represented by Formula (4)

For convenience of explanation, formula (4) is shown below again.

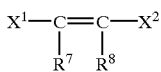 (4)

[In formula (4), $X^1$ and $X^2$ may be the same or different, are located in the cis positions, and each represents a halogen atom; and $R^7$ and $R^8$ may be the same or different and each represents a hydrogen atom, an alkyl group, or an aryl group.]

Examples of the halogen atoms represented by $X^1$ and $X^2$, which are located in the cis positions, in formula (4) include chlorine, bromine, and iodine atoms.

Examples of the alkyl group represented by $R^7$ or $R^8$ in formula (4) include methyl, ethyl, isopropyl, and n-propyl. Examples of the aryl group in formula (4) include phenyl.

Examples of the compounds represented by formula (4) include cis-1,2-dichloroethylene, cis-1,2-dibromoethylene, and cis-1,2-diiodoethylene.

(ii) Compounds Represented by Formula (5)

For convenience of explanation, formula (5) is shown below again.

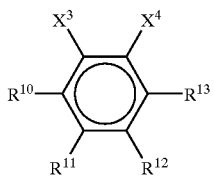 (5)

[In formula (5), $X^3$ and $X^4$ may be the same or different and each represents a halogen atom or $—SO_3R^9$, wherein $R^9$ represents an alkyl group, a fluoroalkyl group, or an aryl group; and $R^{10}$ to $R^{13}$ may be the same or different and each represents a hydrogen atom, a fluorine atom, an alkyl group, a halogenated alkyl group, or an aryl group.]

Examples of the halogen atom represented by $X^3$ or $X^4$ in formula (5) include bromine and iodine atoms. In the group represented by $—SO_3R^9$, examples of the alkyl group represented by $R^9$ include methyl, ethyl, isopropyl, and n-propyl; examples of the fluoroalkyl group represented by $R^9$ include trifluoromethyl and pentafluoroethyl; and examples of the aryl group represented by $R^9$ include phenyl, pentafluorophenyl, p-tolyl, and p-fluorophenyl. Examples of the group represented by $—SO_3R^9$ include methylsulfonyloxy, trifluoromethylsulfonyloxy, phenylsulfonyloxy, p-tolylsulfonyloxy, and p-fluorophenylsulfonyloxy.

Examples of the compounds represented by formula (5) include 1,2-dibromobenzene, 1,2-diiodobenzene, and 1,2-di(trifluoromethylsulfonyloxy)benzene.

The compounds represented by formulae (4) and (5) enumerated above as examples of polymerizable ingredient (A1) can be used alone or in combination of two or more thereof.

(2) Polymerizable Ingredient (B1)

Polymerizable ingredient (B1) is at least one compound represented by formula (6).

For convenience of explanation, formula (6) is shown below again.

 (6)

[In formula (6), Ar' represents a bivalent organic group.]

Examples of the bivalent organic group represented by Ar' in formula (6) include 1,2-phenylene, 1,3-phenylene, 1,4-phenylene, and the groups (a) to (j) shown above.

Preferred of these are 1,3-phenylene, 1,4-phenylene, and the groups (a) and (d) shown above.

Examples of the compound represented by formula (6) include 1,2-diethynylbenzene, 1,3-diethynylbenzene, 1,4-diethynylbenzene, 1,2,4-triethynylbenzene, 1,3,5-triethynylbenzene, 2,5-diethynyltoluene, 3,4-diethynyltoluene, 4,4'-diethynylbiphenyl, 3,3'-diethynylbiphenyl, 3,4'-diethynylbiphenyl, 4,4'-diethynyldiphenyl ether, 3,3'-diethynyldiphenyl ether, 3,4'-diethynyldiphenyl ether, 4,4'-diethynylbenzophenone, 3,3'-diethynylbenzophenone, 3,4'-diethynylbenzophenone, 4,4'-diethynyldiphenylmethane, 3,3'-diethynyldiphenylmethane, 3,4'-diethynyldiphenylmethane, 4,4'-diethynylbenzoic acid phenyl ester, 3,3'-diethynylbenzoic acid phenyl ester, 3,4'-diethynylbenzoic acid phenyl ester, 4,4'-diethynylbenzanilide, 3,3'-diethynylbenzanilide, 3,4'-diethynylbenzanilide, 4,4'-diethynyldiphenyl sulfide, 3,3'-diethynyldiphenyl sulfide, 3,4'-diethynyldiphenyl sulfide, 4,4'-diethynyldiphenyl sulfone, 3,3'-diethynyldiphenyl sulfone, 3,4'-diethynyldiphenyl sulfone, 2,4,4'-triethynyldiphenyl ether, 9,9-bis(4-ethynylphenyl)fluorene, 4,4"-diethynyl-p-terphenyl, 4,4"-diethynyl-m-terphenyl, 4,4"-diethynyl-o-terphenyl, 2,2-bis(4-ethynylphenyl)propane, 2,2-bis(4-ethynylphenyl)hexafluoropropane, bis(4-ethynylphenyl)diphenylmethane, 9,9-bis[4-(4-ethynylphenoxy)phenyl]fluorene, 9,9-bis[4-(3-ethynylphenoxy)phenyl]fluorene, 4,4'-diethynylbibenzyl, 1,4-diethynylnaphthalene, 9,10-diethynylanthracene, 2,6-diethynylpyridine, 2,3-diethynylthiophene, 2,5-diethynylthiophene, 3,4-diethynylthiophene, 2,5-diethynylfuran, and 4,4'-diethynyldibenzofuran. Especially preferred from the standpoint of heat resistance are 1,2-diethynylbenzene, 1,3-diethynylbenzene, 1,4-diethynylbenzene, 1,2,4-triethynylbenzene, 1,3,5-triethynylbenzene, 2,5-diethynyltoluene, 3,4-diethynyltoluene, 4,4'-diethynylbiphenyl, 3,3'-diethynylbiphenyl, 3,4'-diethynylbiphenyl, 4,4'-diethynyldiphenyl ether, 3,3'-diethynyldiphenyl ether, 3,4'-diethynyldiphenyl ether, and 9,9-bis(4-ethynylphenyl)fluorene.

The compounds represented by formula (6) enumerated above as examples of polymerizable ingredient (B1) can be used alone or in combination of two or more thereof.

In the first process, the molar ratio of polymerizable ingredient (A1) to polymerizable ingredient (B1), (A1)/(B1), is preferably from 0.1 to 2.0, more preferably from 0.5 to 1.5, most preferably from 0.9 to 1.1.

The polymerization of polymerizable ingredient (A1) with polymerizable ingredient (B1) in the first process is preferably conducted in the presence of a catalyst system containing a transition metal compound (preferably the catalyst system described below which comprises a combination of a palladium catalyst comprising a palladium compound with a basic compound).

The catalyst for use in the first process is preferably a catalyst system comprising a transition metal compound and a basic compound. This catalyst system is preferably constituted of the following components:

1) one or more compounds comprising a palladium salt and ligands or comprising palladium (salt) having ligands coordinated thereto (ligands may be added according to need);
2) a compound of univalent copper.

Examples of the palladium salt include palladium chloride, palladium bromide, and palladium iodide. Examples of the ligands include triphenylphosphine, tri-o-tolylphosphine, tricyanophenylphosphine, and tricyanomethylphosphine. Preferred of these is triphenylphosphine.

Examples of the palladium (salt) having ligands coordinated thereto beforehand include dichlorobis(triphenylphosphine)palladium, dibromobis(triphenylphosphine)palladium, diiodobis(triphenylphosphine)palladium, dichlorobis(tri-o-tolylphosphine)palladium, dichlorobis(tricyanophenylphosphine)palladium, dichlorobis(tricyanomethylphosphine)palladium, dibromobis(tri-o-tolylphosphine)palladium, dibromobis(tricyanophenylphosphine)palladium, dibromobis(tricyanomethylphosphine)palladium, diiodobis(tri-o-tolylphosphine)palladium, diiodobis(tricyanophenylphosphine)palladium, diiodobis(tricyanomethylphosphine)palladium, tetrakis(triphenylphosphine)palladium, tetrakis(tri-o-tolylphosphine)palladium, tetrakis(tricyanophenylphosphine)palladium, and tetrakis(tricyanomethylphosphine)palladium. Preferred of these are dichlorobis(triphenylphosphine)palladium and tetrakis(triphenylphosphine)palladium.

Examples of the compound of univalent copper include copper(I) chloride, copper(I) bromide, and copper(I) iodide.

The catalyst components described above are used in the following proportions.

The palladium salt is used in an amount of preferably from 0.0001 to 10 mol, more preferably from 0.001 to 1 mol, per mol of the sum of all the polymerizable ingredients. If the amount thereof is smaller than 0.0001 mol, there are cases where the polymerization does not proceed sufficiently. On the other hand, if the amount thereof exceeds 10 mol, there are cases where purification is difficult.

The ligands are used in an amount of preferably from 0.0004 to 50 mol, more preferably from 0.004 to 5 mol, per mol of the sum of all the polymerizable ingredients. If the amount thereof is smaller than 0. 0004 mol, there are cases where the polymerization does not proceed sufficiently. On the other hand, if the amount thereof exceeds 50 mol, there are cases where purification is difficult.

The palladium (salt) having ligands coordinated thereto beforehand is used in an amount of preferably from 0.0001 to 10 mol, more preferably from 0.001 to 1 mol, per mol of the sum of all the polymerizable ingredients. If the amount thereof is smaller than 0.0001 mol, there are cases where the polymerization does not proceed sufficiently. On the other hand, if the amount thereof exceeds 10 mol, there are cases where purification is difficult.

The compound of univalent copper is used in an amount of preferably from 0.0001 to 1 0 mol, more preferably from 0.001 to 1 mol, per mol of the sum of all the polymerizable ingredients.

If the amount thereof is smaller than 0.0001 mol, there are cases where the polymerization does not proceed sufficiently. On the other hand, if the amount thereof exceeds 10 mol, there are cases where purification is difficult.

On the other hand, examples of the basic compound include pyridine, pyrrole, piperazine, pyrrolidine, piperidine, picoline, trimethylamine, triethylamine, monoethanolamine, diethanolamine, dimethylmonoethanolamine, monomethyldiethanolamine, triethanolamine, diazabicyclooctane, diazabicyclononane, diazabicycloundecene, tetramethylammonium hydroxide, diethylamine, ammonia, n-butylamine, and imidazole. Preferred of these are diethylamine, piperidine, and n-butylamine.

The base is used in an amount of preferably from 1 to 1,000 mol, more preferably from 1 to 100 mol, per mol of the sum of all the polymerizable ingredients. If the amount thereof is smaller than 1 mol, there are cases where the polymerization does not proceed sufficiently. On the other hand, amounts thereof exceeding 100 mol are uneconomical.

A solvent can be used according to need in this process of the invention. The polymerization solvent is not particularly limited. Examples thereof include halogenated solvents such as chloroform, dichloromethane, 1,2-dichloroethane, chlorobenzene, and dichlorobenzene; aromatic hydrocarbon solvents such as benzene, toluene, xylene, mesitylene, and diethylbenzene; ether solvents such as diethyl ether, tetrahydrofuran (THF), dioxane, diglyme, and anisole; ketone solvents such as acetone, methyl ethyl ketone, 2-heptanone, and cyclohexanone; ester solvents such as ethyl acetate, ethyl lactate, and γ-butyrolactone; and amide solvents such as N,N-dimethylformamide, N,N-dimethylacetamide, and N-methyl-2-pyrrolidone. It is preferred to sufficiently dry and deoxidize these solvents before use.

The concentration of the monomers (polymerizable ingredients) in the polymerization solvent is preferably from 1 to 80% by weight, more preferably from 5 to 60% by weight.

The polymerization temperature in the first process is preferably from 0 to 150° C., more preferably from 10 to 100° C. The polymerization period is preferably from 0.5 to 100 hours, more preferably from 1 to 40 hours.

2. Second Process

In the second process, polymerizable ingredient (A2) is polymerized with polymerizable ingredient (B2).

(1) Polymerizable Ingredient (A2)

Polymerizable ingredient (A2) is at least one member selected from the group consisting of compounds represented by formula (7) and compounds represented by formula (8).

(i) Compounds Represented by Formula (7)

For convenience of explanation, formula (7) is shown below again.

(7)

[In formula (7), $R^{14}$ and $R^{15}$ may be the same or different, are located in the cis positions, and each represents a hydrogen atom, an alkyl group, or an aryl group.]

Examples of the alkyl group represented by $R^{14}$ or $R^{15}$ in formula (7) include methyl, ethyl, isopropyl, and n-propyl. Examples of the aryl group in formula (7) include phenyl.

Examples of the compounds represented by formula (7) include (Z)-hex-3-ene-1,5-diyne.

(ii) Compounds Represented by Formula (8)

For convenience of explanation, formula (8) is shown below again.

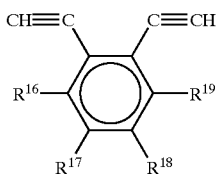

(8)

[In formula (8), $R^{16}$ to $R^{19}$ may be the same or different and each represents a hydrogen atom, a fluorine atom, an alkyl group, a halogenated alkyl group, or an aryl group.]

In formula (8), examples of the alkyl group represented by each of $R^{16}$ to $R^{19}$ include methyl, ethyl, isopropyl, and n-propyl; examples of the halogenated alkyl group include trifluoromethyl and pentafluoroethyl; and examples of the aryl group include phenyl and pentafluorophenyl.

Examples of the compounds represented by formula (8) include 1,2-diethynylbenzene.

The compounds represented by formulae (7) and (8) enumerated above as examples of polymerizable ingredient (A2) can be used alone or in combination of two or more thereof.

(2) Polymerizable Ingredient (B2)

Polymerizable ingredient (B2) is at least one compound represented by formula (9).

For convenience of explanation, formula (9) is shown below again.

$$X^5\text{—Ar''—}X^6 \qquad (9)$$

[In formula (9), $X^5$ and $X^6$ may be the same or different and each represents a halogen atom or $-SO_3R^{20}$, wherein $R^{20}$ represents an alkyl group, a fluoroalkyl group, or an aryl group; and Ar'' represents a bivalent organic group.]

Examples of the halogen atom represented by $X^5$ or $X^6$ in formula (9) include bromine and iodine atoms. In the group represented by $-SO_3R^{20}$, examples of the alkyl group represented by $R^{20}$ include methyl, ethyl, isopropyl, and n-propyl; examples of the fluoroalkyl group represented by $R^{20}$ include trifluoromethyl and pentafluoroethyl; and examples of the aryl group represented by $R^{20}$ include phenyl, pentafluorophenyl, p-tolyl, and p-fluorophenyl. Examples of the group represented by $-SO_3R^{20}$ include methylsulfonyloxy, trifluoromethylsulfonyloxy, phenylsulfonyloxy, p-tolylsulfonyloxy, and p-fluorophenylsulfonyloxy.

Examples of the bivalent organic group represented by Ar'' in formula (9) include 1,2-phenylene, 1,3-phenylene, 1,4-phenylene, and the groups (a) to (j) shown above.

Preferred of these are 1,3-phenylene, 1,4-phenylene, and the groups (a) and (d) shown above.

Examples of the compound represented by formula (9) include 1,2-dibromobenzene, 1,3-dibromobenzene, 1,4-dibromobenzene, 1,2-diiodobenzene, 1,3-diiodobenzene, 1,4-diiodobenzene, 1,2-di(trifluoromethylsulfonyloxy) benzene, 1,3-di(trifluoromethylsulfonyloxy)benzene, 1,4-di (trifluoromethylsulfonyloxy)benzene, 9,9-bis(4-bromophenyl)fluorene, 9,9-bis(4-iodophenyl)fluorene, 9,9-bis(4-trifluoromethylsulfonyloxyphenyl)fluorene, 9,9-bis[4-(4-bromophenoxy)phenyl]fluorene, 9,9-bis[4-(4-iodophenoxy)phenyl]fluorene, 3,3'-dibromodiphenyl ether, 3,3'-diiododiphenyl ether, 3,3'-di (trifluoromethylsulfonyloxy)diphenyl ether, 3,4'-dibromodiphenyl ether, 3,4'-diiododiphenyl ether, 3,4'-di (trifluoromethylsulfonyloxy)diphenyl ether, 4,4'-dibromodiphenyl ether, 4,4'-diiododiphenyl ether, 4,4'-di (trifluoromethylsulfonyloxy)diphenyl ether, 2,2-bis(4-bromophenyl)hexafluoropropane, 2,2-bis(4-iodophenyl) hexafluoropropane, 2,2-bis(4-trifluoromethylsulfonyloxyphenyl)hexafluoropropane, 2,5-dibromobenzotrifluoride, 1,2-dibromotetrafluorobenzene, 1,3-dibromotetrafluorobenzene, and 1,4-dibromotetrafluorobenzene.

The compounds represented by formula (9) enumerated above as examples of polymerizable ingredient (B2) can be used alone or in combination of two or more thereof.

In the second process, the molar ratio of polymerizable ingredient (A2) to polymerizable ingredient (B2), (A2)/(B2), is preferably from 0.5 to 2.0, more preferably from 0.7 to 1.5.

(3) Polymerization Method

In the second process, the same polymerization method as in the first process can be used.

3. Third Process

In the third process, at least one compound represented by formula (6) given above is oxidatively polymerized in the presence of a catalyst.

The catalyst used for oxidatively polymerizing the compound represented by formula (6) is preferably one comprising copper. Examples of this catalyst include copper metal, cuprous chloride, cupric chloride, cuprous bromide, cupric bromide, cuprous iodide, cupric iodide, cuprous sulfate, cupric sulfate, cuprous acetate, cupric acetate, cuprous formate, cupric formate, cuprous oxide, cupric oxide, copper (I) triflate, copper(I) methoxide, copper(II) triflate, copper(II) methoxide, copper(II) acetylacetonate, and copper(II) dipivaloylmethane. Preferred of these are the compounds of univalent copper. Especially preferred examples thereof include cuprous chloride, cuprous bromide, cuprous iodide, cuprous acetate, and cuprous formate.

A catalyst comprising silica or alumina and, supported thereon, any of the copper compounds enumerated above can also be used.

In polymerizing the compound represented by formula (6) in the presence of a catalyst, a promoter can be used in order to increase the molecular weight of the polymer which is being produced. Examples of the promoter include pyridine, quinoline, pyrrole, piperazine, pyrrolidine, piperidine, picoline, trimethylamine, triethylamine, tripropylamine, tributylamine, monoethanolamine, diethanolamine, dimethylmonoethanolamine, monomethyldiethanolamine, triethanolamine, bipyridine, N,N,N',N'-tetramethylethylenediamine, diazabicyclooctane, diazabicyclononane, diazabicycloundecene, tetramethylammonium hydroxide, diethylamine, ammonia, methylamine, ethylamine, propylamine, butylamine, and imidazole. Especially preferred are pyridine, bipyridine, quinoline, and N,N,N',N'-tetramethylethylenediamine.

In this process, the catalyst is used in an amount of generally from 0.0001 to 10 mol, preferably from 0.001 to 1 mol, per mol of all the compounds represented by formula (6). If the amount thereof is smaller than 0.0001 mol, there are cases where the polymerization does not proceed sufficiently. On the other hand, if the amount thereof exceeds 10 mol, there are cases where purification is difficult. The promoter is used in an amount of generally from 0.0004 to 50 mol, preferably from 0.004 to 5 mol, per mol of all the compounds represented by formula (6). If the amount of the promoter is smaller than 0.0004 mol, there are cases where the polymerization does not proceed sufficiently. On the other hand, if the promoter amount exceeds 50 mol, there are cases where polymer precipitation occurs.

A polymerization solvent can be used in this process. Examples thereof include halogenated solvents such as chloroform, dichloromethane, 1,2-dichloroethane, chlorobenzene, dichlorobenzene, and trichlorobenzene; aromatic hydrocarbon solvents such as benzene, toluene, xylene, mesitylene, and diethylbenzene; ether solvents such as diethyl ether, tetrahydrofuran, dioxane, diglyme, and anisole; ketone solvents such as acetone, methyl ethyl ketone, methyl isobutyl ketone, 2-heptanone, cyclohexanone, and cyclopentanone; ester solvents such as methyl acetate, ethyl acetate, methyl lactate, ethyl lactate, γ-butyrolactone, and γ-butyrolactam; amide solvents such as N,N-dimethylformamide, N,N-dimethylacetamide, N-methyl-2-pyrrolidone, and N-methylimidazolidinone; and polar solvents such as nitrobenzene, carbon disulfide, nitromethane, and dimethyl sulfoxide. Preferred of these are nitrobenzene, chloroform, dichloromethane, and 1,2-dichloroethane, which are excellent in the ability to dissolve the target polymer therein.

The concentration of the compound represented by formula (6) in the polymerization solvent is preferably from 1 to 80% by weight, more preferably from 5 to 60% by weight. If the concentration of the compound represented by formula (6) is lower than 1% by weight, it is difficult to increase the molecular weight of the polymer being produced. If the concentration thereof exceeds 80% by weight, there is the possibility of polymer precipitation.

The temperature for this polymerization is generally from 0 to 150° C., preferably from 10 to 100° C. The polymerization period is generally from 0.5 to 100 hours, preferably from 1 to 80 hours.

The polymer has a weight-average molecular weight, calculated for standard polystyrene, of generally from 500 to 200,000.

For enabling the oxidative polymerization of the compound represented by formula (6) to proceed in the invention, it is necessary to cause oxygen to be present in the reactant solution. It is therefore necessary to use a method comprising agitating the solution in air to thereby incorporate oxygen present in the air into the reaction mixture, or to bubble air and/or oxygen into the reaction mixture.

III. Cured Film

The cured film of the invention is obtained by applying a solution of the diyne-containing (co)polymer in an organic solvent to a substrate and curing the coating film optionally through a heat treatment.

1. Application to Substrate

The cured film of the invention can be formed, for example, by dissolving the diyne-containing (co)polymer in a solvent and applying the solution to a substrate such as, e.g. a semiconductor chip (silicon wafer, $SiO_2$ wafer, or SiN wafer), glass, ceramic, or metal. The cured film of the invention is suitable for use as an insulating film formed on a semiconductor chip, e.g., a silicon wafer, $SiO_2$ wafer, or SiN wafer, among the substrates shown above.

Examples of methods for the application include spin coating, dipping, casting, and coating with a roller blade.

As the solvent in which the diyne-containing (co)polymer is to be dissolved can be used at least one member selected from the group consisting of, for example, ether solvents, ester solvents, aromatic hydrocarbon solvents, amide solvents, and ketone solvents. By using these solvents, a composition can be obtained which has satisfactory applicability (processability) and excellent storage stability.

(i) Ether Solvents

Examples of the ether solvents include ethyl ether, isopropyl ether, n-butyl ether, n-hexyl ether, 2-ethylhexyl ether, ethylene oxide, 1,2-propylene oxide, dioxolane, 4-methyldioxolane, dioxane, dimethyldioxane, ethylene glycol monomethyl ether, ethylene glycol monoethyl ether, ethylene glycol diethyl ether, ethylene glycol mono-n-butyl ether, ethylene glycol mono-n-hexyl ether, ethylene glycol monophenyl ether, ethylene glycol mono-2-ethylbutyl ether, ethylene glycol dibutyl ether, diethylene glycol monomethyl ether, diethylene glycol monoethyl ether, diethylene glycol diethyl ether, diethylene glycol mono-n-butyl ether, diethylene glycol di-n-butyl ether, diethylene glycol mono-n-hexyl ether, ethoxytriglycol, tetraethylene glycol di-n-butyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, tripropylene glycol monomethyl ether, tetrahydrofuran, and 2-methyltetrahydrofuran.

(ii) Ester Solvents

Examples of the ester solvents include diethyl carbonate, methyl acetate, ethyl acetate, γ-butyrolactone, γ-valerolactone, n-propyl acetate, isopropyl acetate, n-butyl acetate, isobutyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, cyclohexyl acetate, methylcyclohexyl acetate, n-nonyl acetate, methyl acetoacetate, ethyl acetoacetate, ethylene glycol monomethyl ether acetate, ethylene glycol monoethyl ether acetate, diethylene glycol monomethyl ether acetate, diethylene glycol monoethyl ether acetate, diethylene glycol mono-n-butyl ether acetate, propylene glycol monomethyl ether acetate, propylene glycol monoethyl ether acetate, propylene glycol monopropyl ether acetate, propylene glycol monobutyl ether acetate, dipropylene glycol monomethyl ether acetate, dipropylene glycol monoethyl ether acetate, glycol diacetate, methoxytriglycol acetate, ethyl propionate, n-butyl propionate, isoamyl propionate, diethyl oxalate, di-n-butyl oxalate, methyl lactate, ethyl lactate, n-butyl lactate, n-amyl lactate, diethyl malonate, dimethyl phthalate, diethyl phthalate, methoxymethyl propionate, and ethoxyethyl propionate.

(iii) Aromatic Hydrocarbon Solvents

Examples of the aromatic hydrocarbon solvents include benzene, toluene, xylene, mesitylene, ethylbenzene, trimethylbenzene, methylethylbenzene, n-propylbenzene, isopropylbenzene, diethylbenzene, isobutylbenzene, triethylbenzene, diisopropylbenzene, n-amylnaphthalene, and trimethylbenzene.

(iv) Amide Solvents

Examples of the amide solvents include N-methylformamide, N,N-dimethylformamide, N,N-diethylformamide, acetamide, N-methylacetamide, N,N-dimethylacetamide, N-methylpropionamide, and N-methylpyrrolidone.

(v) Ketone Solvents

Examples of the ketone solvents include acetone, methyl ethyl ketone, methyl n-propyl ketone, diethyl ketone, methyl isobutyl ketone, methyl n-pentyl ketone, ethyl n-butyl ketone, methyl n-hexyl ketone, diisobutyl ketone, trimethylnonanone, cyclohexanone, methylcyclohexanone, 2-hexanone, 2,4-pentanedione, acetonylacetone, diacetone alcohol, acetophenone, and fenchone.

These solvents can be used alone or in combination of two or more thereof.

The solvent is incorporated in an amount of generally from 50 to 10,000 parts by weight, preferably from 100 to 2,000 parts by weight, per 100 parts by weight of the diyne-containing (co)polymer. Namely, the proportion by weight of the diyne-containing (co)polymer to the solvent is generally 1/(0.5–100), preferably 1/(1–20). If the solvent amount is smaller than 50 parts by weight, there are cases where a homogeneous solution is not obtainable. If the solvent amount exceeds 10,000 parts by weight, there are cases where a desired film thickness cannot be obtained.

A surfactant, adhesion promoter, radical generator, and the like may be added according to need.

Examples of the surfactant include nonionic surfactants, anionic surfactants, cationic surfactants, and amphoteric surfactants. Examples thereof further include fluorochemical surfactants, silicone surfactants, poly(alkylene oxide) surfactants, and poly(meth)acrylate surfactants. Preferred of these are fluorochemical surfactants and silicone surfactants.

The adhesion promoter is preferably a silane coupling agent. Examples thereof include 3-glycidyloxypropyltrimethoxysilane, 3-aminoglycidyloxypropyltriethoxysilane, 3-methacryloxypropyltrimethoxysilane, 3-glycidyloxypropylmethyldimethoxysilane, 1-methacryloxypropylmethyldimethoxysilane, 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-methoxycarbonyl-3-aminopropyltrimethoxysilane, N-ethoxycarbonyl-3-aminopropyltriethoxysilane, N-triethoxysilylpropyltriethylenetriamine, N-triethoxysilylpropyltriethylenetriamine, 10-trimethoxysilyl-1,4,7-triazadecane, 10-triethoxysilyl-1,4,7-triazadecane, 9-trimethoxysilyl-3,6-diazanonyl acetate, 9-triethoxysilyl-3,6-diazanonyl acetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N,N'-bis(oxyethyl)-3-aminopropyltrimethoxysilane, and N,N'-bis(oxyethyl)-3-aminopropyltriethoxysilane.

These adhesion promoters may be used alone, or two or more thereof may be used simultaneously.

The composition for film formation of the invention may contain a radical generator so as to give a coating film having an improved crosslink density.

Examples of the radical generator include isobutyryl peroxide, α,α'-bis(neodecanoylperoxy)diisopropylbenzene, cumyl peroxyneodecanoate, di-n-propyl peroxydicarbonate, diisopropyl peroxydicarbonate, 1,1,3,3-tetramethylbutyl peroxyneodecanoate, bis(4-t-butylcyclohexyl) peroxydicarbonate, 1-cyclohexyl-1-methylethyl peroxyneodecanoate, di-2-ethoxyethyl peroxydicarbonate, di(2-ethylhexyl)peroxydicarbonate, t-hexyl peroxyneodecanoate, dimethoxybutyl peroxydicarbonate, di(3-methyl-3-methoxybutyl)peroxydicarbonate, t-butyl peroxyneodecanoate, 2,4-dichlorobenzoyl peroxide, t-hexyl peroxypivalate, t-butyl peroxypivalate, 3,5,5-trimethylhexanoyl peroxide, octanoyl peroxide, lauroyl peroxide, stearoyl peroxide, 1,1,3,3-tetramethylbutyl peroxy-2-ethylhexanoate, succinic peroxide, 2,5-dimethyl-2,5-di(2-ethylhexanoylperoxy)hexane, 1-cyclohexyl-1-methylethyl peroxy-2-ethylhexanoate, t-hexyl peroxy-2-ethylhexanoate, t-butyl peroxy-2-ethylhexanoate, m-toluoyl benzoyl peroxide, benzoyl peroxide, t-butyl peroxyisobutyrate, di-t-butylperoxy-2-methylcyclohexane, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy)cyclohexane, 2,2-bis(4,4-di-t-butylperoxycyclohexyl)propane, 1,1-bis(t-butylperoxy)cyclodecane, t-hexyl peroxyisopropylmonocarbonate, t-butyl peroxymaleate, t-butyl peroxy-3,3,5-trimethylhexanoate, t-butyl peroxylaurate, 2,5-dimethyl-2,5-di(m-toluoylperoxy)hexane, t-butyl peroxyisopropylmonocarbonate, t-butyl peroxy-2-ethylhexylmonocarbonate, t-hexyl peroxybenzoate, 2,5-dimethyl-2, 5-di(benzoylperoxy)hexane, t-butyl peroxyacetate, 2,2-bis(t-butylperoxy)butane, t-butyl peroxybenzoate, n-butyl 4,4-bis(t-butylperoxy) valerate, di-t-butyl peroxyisophthalate, α,α'-bis(t-butylperoxy)diisopropylbenzene, dicumyl peroxide, 2,5-dimethyl-2,5-di (t-butylperoxy)hexane, t-butyl cumyl peroxide, di-t-butyl peroxide, p-menthyl hydroperoxide, 2,5-dimethyl-2,5-di(t-butylperoxy)hexyne-3, diisopropylbenyl hydroperoxide, t-butyl trimethylsilyl peroxide, 1,1,3,3-tetramethylbutyl hydroperoxide, cumyl hydroperoxide, t-hexyl hydroperoxide, t-butyl hydroperoxide, dibenzyl, 2,3-dimethyl-2,3-diphenylbutane, α,α'-dimethoxy-α,α'-diphenylbibenzyl, α,α'-diphenyl-α-methoxybibenzyl, α,α'-diphenyl-α,α'-dimethoxybibenzyl, α,α'-dimethoxy-α,α'-dimethylbibenzyl, α,α'-dimethoxybibenzyl, 3,4-dimethyl-3,4-diphenyl-n-hexane, and 2,2,3,3-tetraphenylsuccinonitrile.

These compounds may be used alone, or two or more thereof may be used simultaneously.

The radical generator is used in an amount of generally from 0.1 to 30 parts by weight, preferably from 0. 5 to 25 parts by weight, per 100 parts by weight of the polymer.

2. Heat Treatment

In producing the cured film of the invention, the coating film is preferably heat-cured by subjecting the thus-obtained coated substrate to a heat treatment at a temperature of from 200 to 600° C. usually for from 30 seconds to 120 minutes according to need. For the heating can be used, for example, a hot plate, oven, or furnace. Examples of atmospheres for the heating include the air, a nitrogen or argon atmosphere, vacuum, and a reduced-pressure atmosphere having a controlled oxygen concentration.

The effect of this heat treatment can be judged based on the cured state of the heat-cured coating film determined through an examination in which the cured coating film is immersed in a good solvent therefor for a given period and then examined for the state of the residual coating film, the state of the film surface, the resultant change in film thickness, etc.

The thickness of the cured film is generally from 0.1 to 10 μm.

The cured film of the invention is excellent not only in insulating properties but in heat resistance, solvent resistance, low-dielectric characteristics, and mechanical strength. Consequently, the cured film is useful in applications such as interlayer insulating films for semiconductor devices such as LSIs, system LSIs, DRAMs, SDRAMs, RDRAMs, and D-RDRAMs, protective films such as surface coat films for semiconductor devices, interlayer insulating films for multilayered circuit boards, protective films and insulating films for liquid-crystal display elements, and gas separation membranes.

The invention will be explained below in more detail by reference to the following Examples, but the invention should not be construed as being limited by these Examples in any way.

In the following Examples, all "percents" and "parts" are by weight unless otherwise indicated.

The following properties were determined in the Examples by the following methods.

(1) Weight-average Molecular Weight

Measured by gel permeation chromatography (GPC) and calculated for standard polystyrene.

(2) $^1$H-NMR Spectroscopy

A sample was analyzed at 90 MHz using heavy chloroform as a solvent.

(3) IR Spectroscopy

A sample was analyzed by the KBr method.

(4) Relative Dielectric Constant

A composition sample was applied to an 8-inch silicon wafer by spin coating, and the coated substrate was heated on a hot plate at 80° C. for 5 minutes and then cured at 325° C. or 350° C. for 5 minutes. Aluminum was vapor-deposited as an upper electrode on the resultant coated substrate to produce a substrate for dielectric constant evaluation. Electrostatic capacity was measured at 100 kHz with electrometer HP16451B and precision LCR meter HP4284A, both manufactured by Yokogawa-Hewlett-Packard, Ltd., and the relative dielectric constant was determined using the following equation:

$$\in = C \cdot d / \in_0 \cdot S$$

wherein $\in$ is relative dielectric constant, C is electrostatic capacity, $\in_0$ is dielectric constant in vacuum, and S is the area of the upper electrode.

(5) Heat Resistance

A sample was analyzed by TG/DTA, wherein the sample was held at 425° C. in a nitrogen atmosphere for 2 hours and the resultant weight loss (wt %) was measured.

(6) Solvent Resistance

A cured film was immersed in 90° C. cyclohexanone for 10 minutes and the resultant retention of film thickness was measured.

(7) Modulus of Elasticity (GPa)

A cured film obtained was examined with Nanoindenter XP (manufactured by Nano Instrument) by a continuous method for rigidity measurement.

EXAMPLE 1

Figure 2:
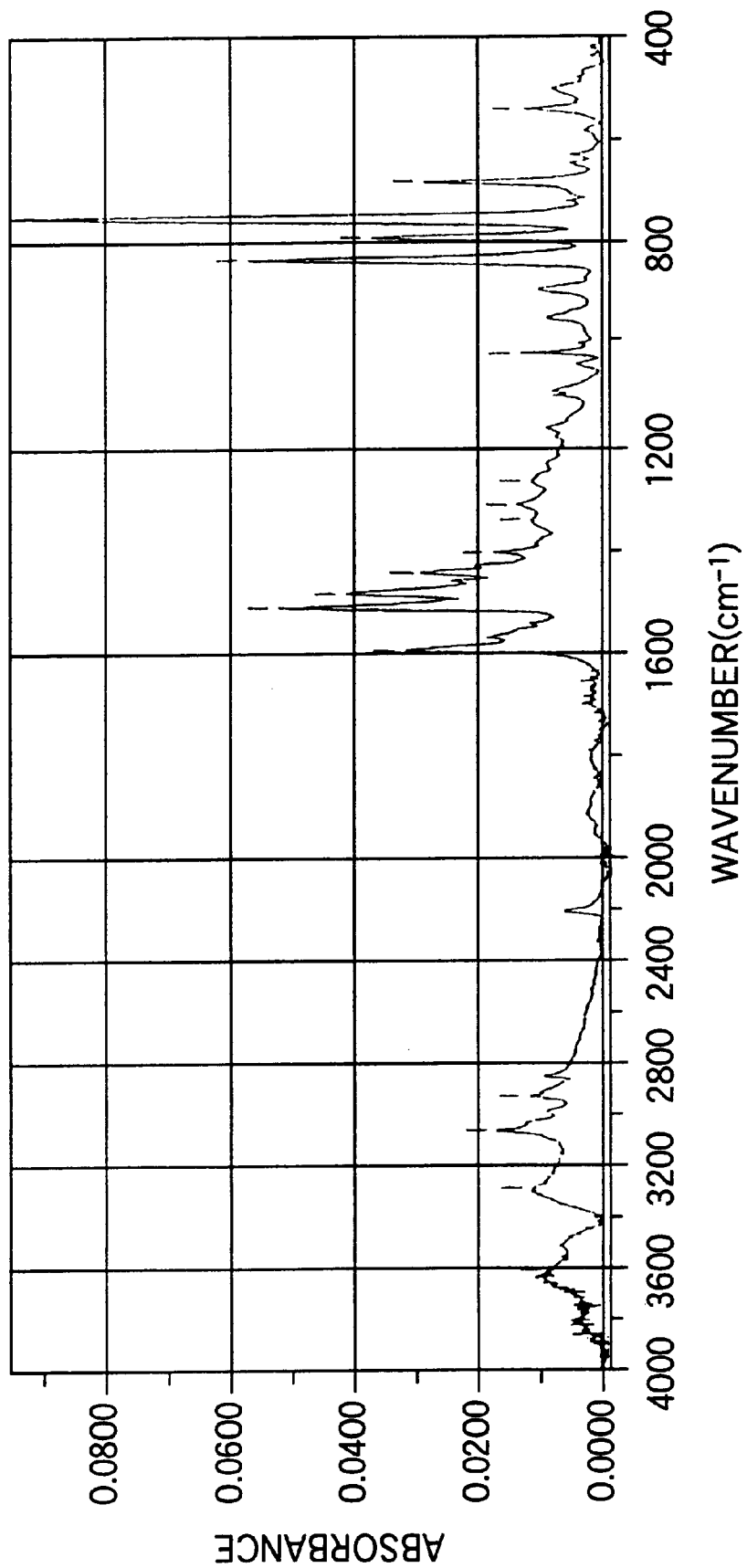
FIG. 2 is a chart showing an IR spectrum of the polymer obtained in Example 1 according to the invention.

Into a 1,000-mL three-necked flask equipped with a thermometer, argon gas feed pipe, and stirrer were introduced 150 mL (1.45 mol) of diethylamine, 2.1 g (3 mmol) of dichlorobis(triphenylphosphine)palladium, 0.286 g (1.50 mmol) of copper iodide, 350 mL of 1,2-dichloroethane, and 99 g of 1,2-diiodobenzene. Thereto were added 18.9 g (150 mmol) of 1,4-diethynylbenzene and 22.7 g (180 mmol) of 1,3-diethynylbenzene. The resultant mixture was reacted at 50° C. for 20 hours. This reaction mixture was subjected twice to precipitation with 5 L of acetic acid. The resultant precipitate was dissolved in chloroform, and the solution was washed with water twice and then subjected to reprecipitation with 5 L of cyclohexane. This precipitate was taken out by filtration and dried to obtain a brown powder having a weight-average molecular weight of 3,500. A $^1$H-NMR spectrum and IR spectrum of the polymer (P1) obtained are shown in FIGS. 1 and 2, respectively.

EXAMPLE 2

Figure 3:
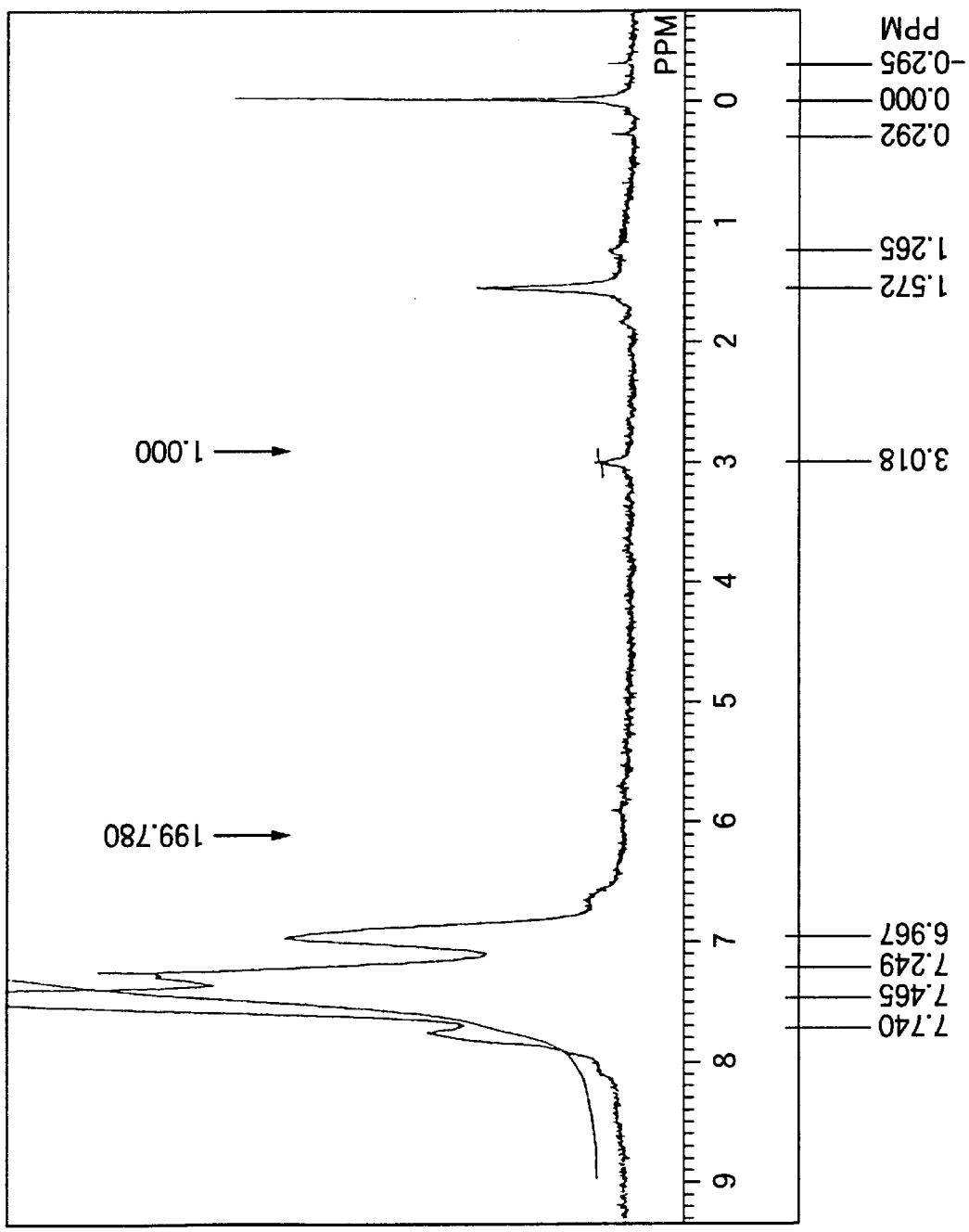
FIG. 3 is a chart showing a $^1$H-NMR spectrum of the polymer obtained in Example 2 according to the invention.
Figure 4:
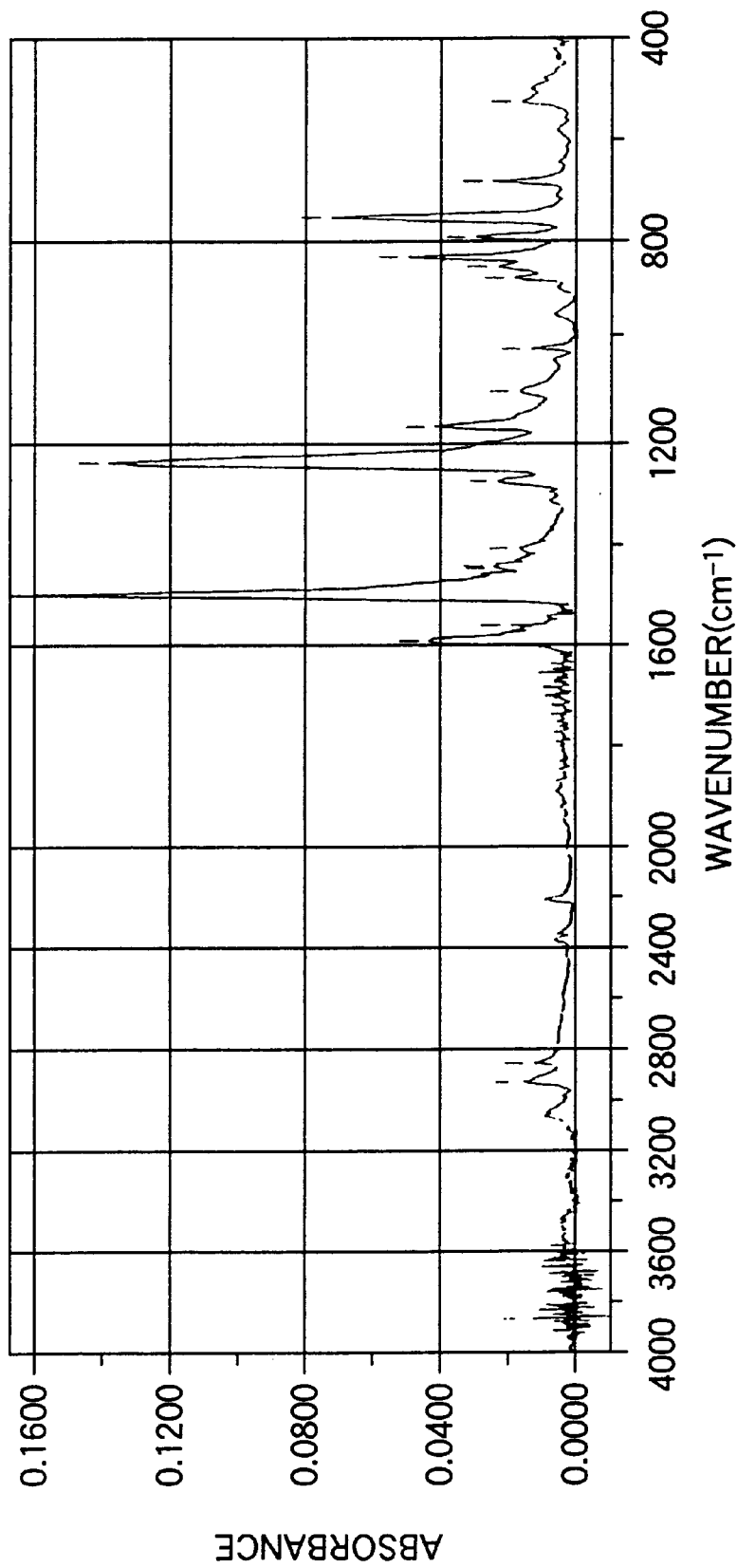
FIG. 4 is a chart showing an IR spectrum of the polymer obtained in Example 2 according to the invention.

The same procedure as in Example 1 was conducted, except that 32.7 g (150 mmol) of 4,4'-diethynyldiphenyl ether was used in place of the 1,4-diethynylbenzene. The polymer (P2) thus obtained had a weight-average molecular weight of 3,800. A $^1$H-NMR spectrum and IR spectrum thereof are shown in FIGS. 3 and 4, respectively.

EXAMPLE 3

Figure 5:
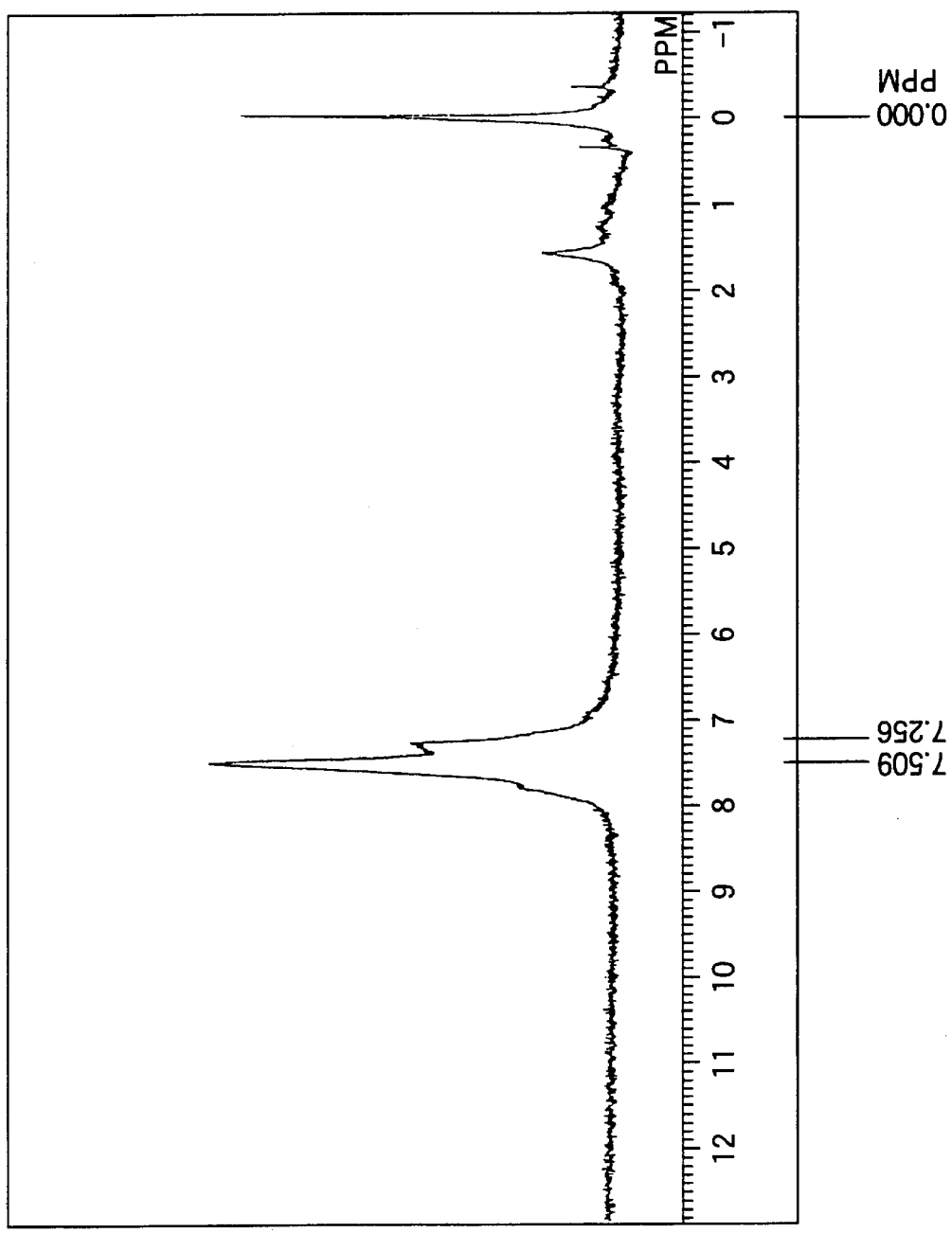
FIG. 5 is a chart showing $^1$H-NMR spectrum of the polymer obtained in Example 3 according to the invention.
Figure 6:
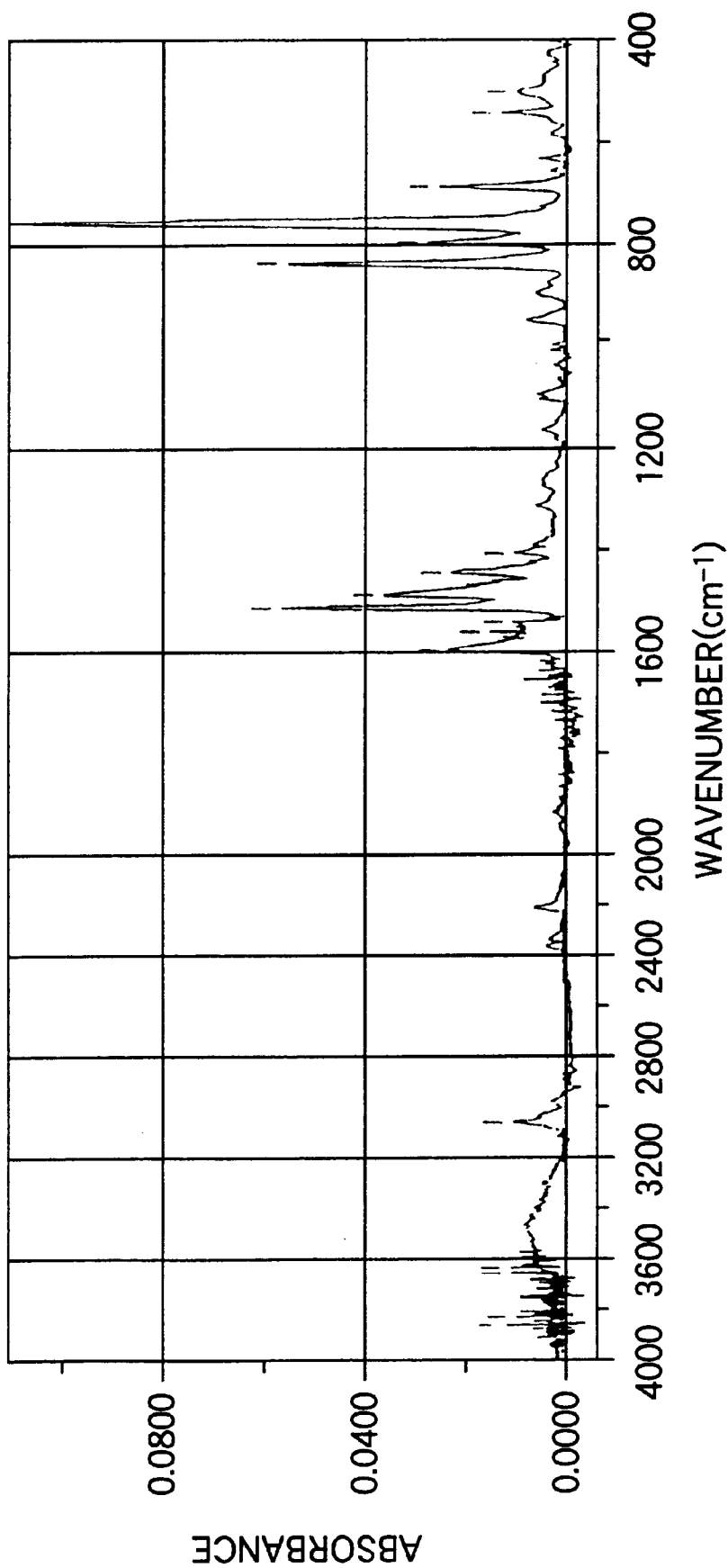
FIG. 6 is a chart showing an IR spectrum of the polymer obtained in Example 3 according to the invention.

The same procedure as in Example 1 was conducted, except that 49.5 g (150 mmol) of 1,3-diiodobenzene and 49.5 g (150 mmol) of 1,4-diiodobenzene were used in place of the 1,2-diiodobenzene and that 41.6 g (330 mmol) of 1,2-diethynylbenzene was used in place of the 1,4-diethynylbenzene and 1,3-diethynylbenzene. The polymer (P3) obtained had a weight-average molecular weight of 2,900. A $^1$H-NMR spectrum and IR spectrum thereof are shown in FIGS. 5 and 6, respectively.

EXAMPLES 4 TO 6

Each of the polymers (P1 to P3) obtained in Examples 1 to 3 was dissolved in cyclohexanone to prepare a polymer solution having a concentration of 20% by weight. Each solution was spin-coated, and the coating was cured by heating it in an oven from 80° C. to 200° C. over 30 minutes in a nitrogen atmosphere and then further burned under vacuum at 425° C. for 1 hour. The coating films obtained were evaluated, and the results obtained are shown in Table 1.

EXAMPLE 7

Into the same reactor as in Example 1 were introduced 2.11 g (3 mmol) of dichlorobis(triphenylphosphine) palladium and 1.14 g (6 mmol) of copper iodide. The atmosphere in the flask was replaced with argon. Thereto were added, in an argon atmosphere, 99 g (300 mmol) of o-diiodobenzene and 150 mL (1.52 mol) of piperidine and 350 mL of THF which both had been deoxidized by argon bubbling. The reaction system was cooled to 10° C. While the system was kept being stirred, a solution prepared by dissolving 18.9 g (150 mmol) of 1,3-diethynylbenzene and 18.9 g (150 mmol) of 1,4-diethynylbenzene in 100 mL of THF was added thereto. The reaction system was then heated to room temperature with stirring. Although piperidinium iodide began to precipitate, the system was further stirred to continue the reaction for 20 hours.

After completion of the polymerization reaction, the reaction mixture, which was a solution, was poured into 3 L of acetic acid to precipitate a polymer yielded. The polymer was collected by filtration and redissolved in chloroform. This polymer solution was washed with water three times and then poured into a large excess of methanol to cause precipitation. The precipitate was collected by filtration and dried under vacuum. Thus, 55 g of a yellow-orange polymer was obtained in a yield of 92%. The polymer (P4) obtained had a weight-average molecular weight of 38,000 as measured by GPC and calculated for standard polystyrene.

This polymer (P4) was dissolved in cyclohexanone to prepare a 15% solution, which was filtered through a 0.2-μm filter. The filtrate was applied to a silicon wafer with a spin coater, and the coating film was heat-cured under the same conditions as in Example 4. The cured film thus obtained had a relative dielectric constant of 2.8 and a pyrolytic loss through 2-hour heating at 425° C. of 0.2%. After the immersion in cyclohexanone, the cured film was free from swelling and had a retention of film thickness of 100%. Furthermore, the cured film had a modulus of elasticity of 5.8 GPa.

TABLE 1

|  | Example 4 | Example 5 | Example 6 | Example 7 |
| --- | --- | --- | --- | --- |
| Polymer | P1 | P2 | P3 | P4 |
| Weight-average molecular weight | 3500 | 3800 | 2900 | 3800 |
| Relative dielectric constant | 2.8 | 2.9 | 2.8 | 2.8 |
| Heat resistance (%) | 1.0 | 1.0 | 0.7 | 0.2 |
| Solvent resistance (%) | 100 | 100 | 100 | 100 |
| Modulus of elasticity (GPa) | 5.5 | 5.0 | 5.6 | 5.8 |

EXAMPLE 8

Into a 100-mL Erlenmeyer flask were introduced 3.79 g of m-diethynylbenzene, 0.15 g of cuprous chloride, and 15 mL of nitrobenzene. The organic ingredients were dissolved. Subsequently, 5 mL of pyridine was added to the reaction mixture, and the mixture was reacted at room temperature for 40 hours while introducing oxygen into the flask through a feed pipe. This reaction mixture was poured into methanol containing 10% hydrochloric acid and cooled on a water bath to thereby cause precipitation. The methanol-insoluble matter was recovered by filtration and dried under vacuum at 70° C. for 10 hours. Thus, the target polymer (P5) was obtained.

This polymer (PS) had a weight-average molecular weight of 3,000.

EXAMPLE 9

Into a 100-mL Erlenmeyer flask were introduced 10.99 g of 9,9'-bis(4-ethynylphenyl)fluorene, 0.15 g of cuprous chloride, and 15 mL of nitrobenzene. The organic ingredients were dissolved. Subsequently, 5 mL of pyridine was added to the reaction mixture, and the mixture was reacted at room temperature for 40 hours while introducing oxygen into the flask through a feed pipe. This reaction mixture was poured into methanol containing 10% hydrochloric acid and cooled on a water bath to thereby cause precipitation. The methanol-insoluble matter was recovered by filtration and dried under vacuum at 70° C. for 10 hours. Thus, the target polymer (P6) was obtained.

This polymer (P6) had a weight-average molecular weight of 12,000.

EXAMPLES 10 AND 11

Each of the polymers (P5 and P6) obtained in Examples 8 and 9 was dissolved in cyclohexanone to prepare a polymer solution having a concentration of 20% by weight. Each solution was spin-coated, and the coating was burned by heating it in an oven from 80° C. to 200° C. over 30 minutes in a nitrogen atmosphere and then further burned under vacuum at 425° C. for 1 hour. The coating films obtained were evaluated, and the results obtained are shown in Table 2.

TABLE 2

|  | Example 10 | Example 11 |
| --- | --- | --- |
| Polymer | P5 | P6 |
| Weight-average molecular weight | 3,000 | 12,000 |
| Relative dielectric constant | 2.9 | 2.8 |
| Heat resistance (%) | 0.1 | 0.1 |
| Solvent resistance (%) | 100 | 100 |
| Modulus of elasticity (GPa) | 6.9 | 6.2 |

As described above in detail, the invention can provide a diyne-containing (co)polymer which is soluble in organic solvents, has excellent processability, and gives a cured coating film excellent in heat resistance, solvent resistance, mechanical strength, and low-dielectric characteristics and which is suitable for use as a material for, e.g., a low-dielectric interlayer insulating film for semiconductor elements such as LSIs, system LSIs, DRAMs, SDRAMs, RDRAMs, and D-RDRAMs, a surface coat film or another protective film for semiconductor elements, a low-dielectric interlayer insulating film for multilayered circuit boards, and a protective film or insulating film for liquid-crystal display elements. The invention can further provides processes for producing the diyne-containing (co)polymer and a cured film.

What is claimed is:

1. A diyne-containing (co)polymer which contains at least 10 mol % repeating units represents by the following formula (1) and has a weight-average molecular weight of from 500 to 1,000,000:

(1)

wherein Y represents a bivalent organic group represented by the following formula (3):

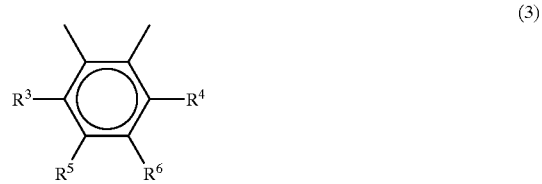

(3)

wherein $R^3$ to $R^6$ may be the same or different and each represents a hydrogen atom, a fluorine atom, an alkyl group, a halogenated alkyl group, or an aryl group; n represents 1; and Ar represents at least one organic group selected from the group consisting of 1,2-phenylene, 1,3-phenylene, 1,4-phenylene and one of the following groups (a) to (j):

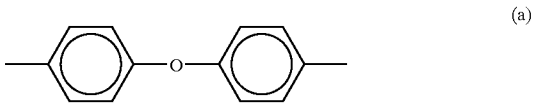

(a)

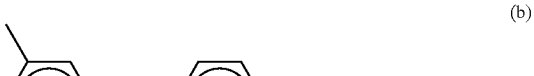

(b)

(c)

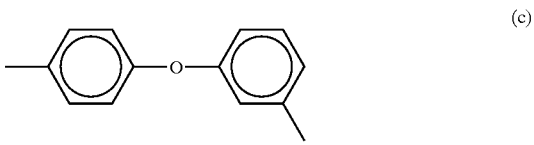

-continued (d) 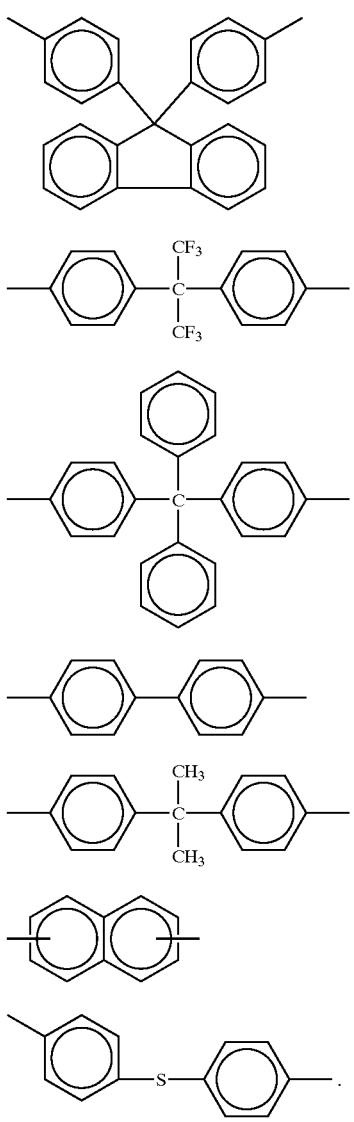

(e)

(f)

(g)

(h)

(i)

(j) 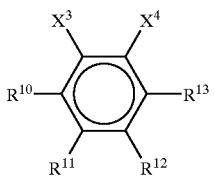

2. A process for producing a diyne-containing (co) polymer which comprises polymerizing at least one compound represented by the following formula (5) with at least one compound represented by the following formula (6):

(5)

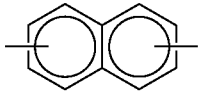

wherein $X^3$ and $X^4$ may be the same or different and each represents a halogen atom or —$SO_3R^9$, wherein $R^9$ represents an alkyk group, a fluoroalkyl group, or an aryl group; and $R^{10}$ to $R^{13}$ may be the same or different and each represents a hydrogen atom, a fluorine atom, an alkyl group, a halogenated alkyl group, or an aryl group;

HC≡C—Ar'—C≡CH (6)

wherein Ar' represents at least one organic group selected from the group consisting of 1,2-phenylene, 1,3-phenylene, 1,4-phenylene and one of the following groups (a) to (j):

(a) 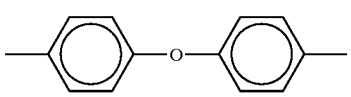

(b) 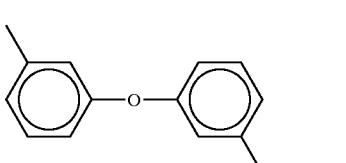

(c) 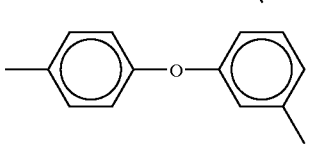

(d) 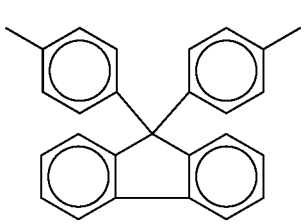

(e) 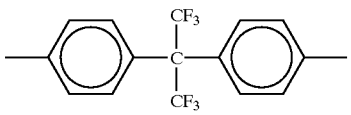

(f) 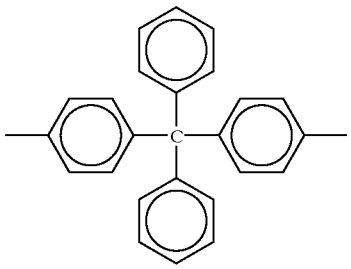

(g) 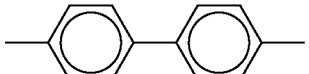

(h) 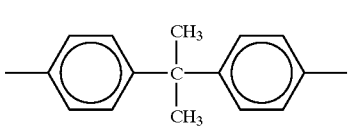

(i)

(j) 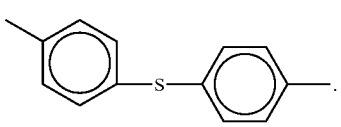

3. A process for producing a diyne-containing (co) polymer which comprises polymerizing at least one com pound represented by the following formula (8) with at least one compound represented by the following formula (9):

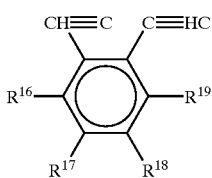 (8)

wherein $R^{16}$ to $R^{19}$ may be the same or different and each represents a hydrogen atom, a fluorine atom, an alkyl group, a halogenated alkyl group, or an aryl group;

$$X^5-Ar''-X^6 \quad (9)$$

wherein $X^5$ and $X^6$ may be the same or different and each represents a halogen atom or $-SO_3R^{20}$, wherein $R^{20}$ represents an alkyl group, a fluoroalkyl group, or an aryl group; and Ar'' represents at least one organic group selected from the group consisting of 1,2-phenylene, 1,3-phenylene, 1,4-phenylene and one of the following groups (a) to (j):

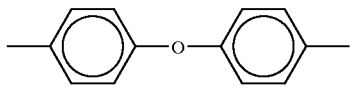 (a)

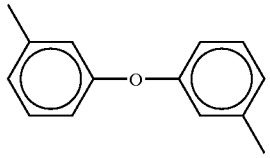 (b)

(c)

(d)

(e)

(f)

(g)

(h)

(i)

(j)

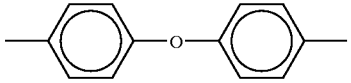
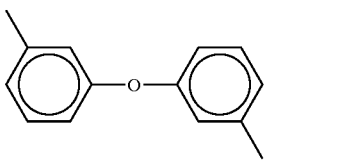
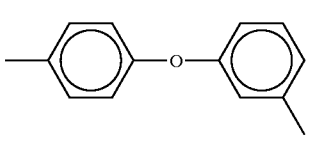
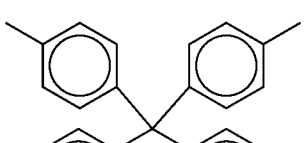
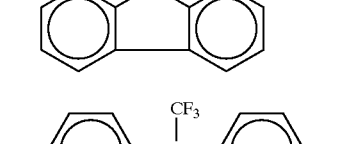
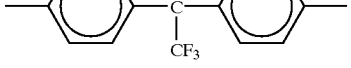

4. A process for producing a diyne-containing (co)polymer which comprises oxidatively polymerizing at least one compound represented by the following formula (6) in the presence of a catalyst:

$$HC\equiv C-Ar'-C\equiv CH \quad (6)$$

wherein Ar' represents at least one organic group selected from the group consisting of 1,2-phenylene, 1,3-phenylene, 1,4-phenylene and one of the following groups (a) to (j):

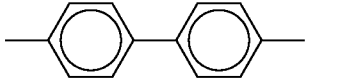 (a)

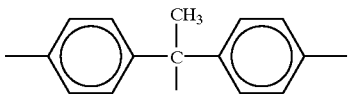 (b)

 (c)

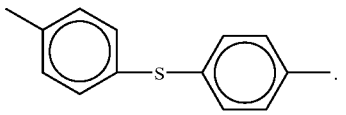 (d)

(e)

-continued (f)
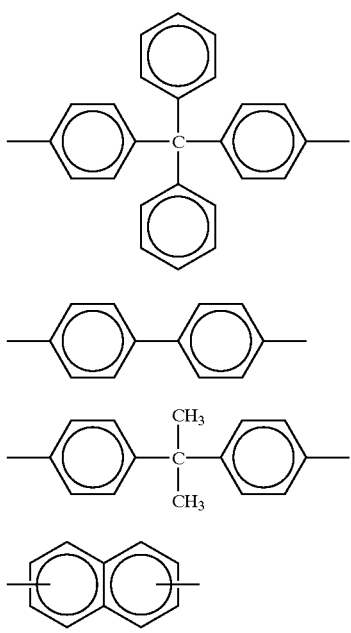

(g)

(h)

(i)

-continued

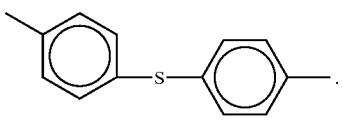
(j)

5. The process for producing a diyne-containing (co) polymer of claim 2 or 3, wherein the polymerization is conducted in the presence of a palladium catalyst and a basic compound.

6. The process of claim 4, wherein the catalyst comprises a copper compound.

7. A cured film obtained by curing the diyne-containing (co)polymer of claim 1.

8. The cured film of claim 7, which is an insulating film.

* * * * *